(12) United States Patent
Yamada et al.

(10) Patent No.: US 10,461,300 B2
(45) Date of Patent: Oct. 29, 2019

(54) BATTERY MODULE

(71) Applicant: KABUSHIKI KAISHA TOYOTA JIDOSHOKKI, Aichi (JP)

(72) Inventors: Masahiro Yamada, Aichi (JP); Hiromi Ueda, Aichi (JP); Takayuki Kato, Aichi (JP); Naoto Morisaku, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 135 days.

(21) Appl. No.: 15/511,539

(22) PCT Filed: May 27, 2015

(86) PCT No.: PCT/JP2015/065273
§ 371 (c)(1),
(2) Date: Mar. 15, 2017

(87) PCT Pub. No.: WO2016/042848
PCT Pub. Date: Mar. 24, 2016

(65) Prior Publication Data
US 2017/0288197 A1   Oct. 5, 2017

(30) Foreign Application Priority Data
Sep. 19, 2014   (JP) ................. 2014-190976

(51) Int. Cl.
*H01M 2/20*   (2006.01)
*H01M 2/06*   (2006.01)
(Continued)

(52) U.S. Cl.
CPC ............ *H01M 2/202* (2013.01); *H01M 2/06* (2013.01); *H01M 2/1011* (2013.01);
(Continued)

(58) Field of Classification Search
CPC ................... H01M 10/0525; H01M 2/202
See application file for complete search history.

(56) References Cited

U.S. PATENT DOCUMENTS

| | | | |
|---|---|---|---|
| 2011/0067920 A1* | 3/2011 | Toyama | B60R 16/0207 174/72 A |
| 2013/0095359 A1 | 4/2013 | Yoshioka et al. | |
| 2014/0216805 A1* | 8/2014 | Adachi | H01B 7/182 174/350 |

FOREIGN PATENT DOCUMENTS

| | | |
|---|---|---|
| CN | 103035875 | 4/2013 |
| JP | 2008-243412 | 10/2008 |

(Continued)

OTHER PUBLICATIONS

International Search Report for PCT/JP2015/065273 dated Jul. 14, 2015, along with English-language translation.
(Continued)

*Primary Examiner* — Olatunji A Godo
(74) *Attorney, Agent, or Firm* — Greenblum & Bernstein, P.L.C.

(57) ABSTRACT

A battery module includes an array body in which a plurality of battery cells are arranged, a plurality of harnesses extending in an array direction of the battery cells in the array body and having connecting terminals of tips connected to electrode terminals of the predetermined battery cells, and a binding member configured to bind the plurality of harnesses in a harness bundle, wherein the harnesses branched off from the binding member have flexure between a position at which the harnesses are bound by the binding member and connecting positions of the electrode terminals and the connecting terminals.

6 Claims, 8 Drawing Sheets

(51) Int. Cl.
*H01M 2/10* (2006.01)
*H01M 2/26* (2006.01)
*H01M 2/30* (2006.01)
*H01M 10/0525* (2010.01)

(52) U.S. Cl.
CPC ....... *H01M 2/1016* (2013.01); *H01M 2/1077* (2013.01); *H01M 2/206* (2013.01); *H01M 2/26* (2013.01); *H01M 2/30* (2013.01); *H01M 10/0525* (2013.01)

(56) References Cited

FOREIGN PATENT DOCUMENTS

| JP | 2010-170884 | | 8/2010 |
| JP | 2013-055069 | | 3/2013 |
| WO | WO 2013054943 | * | 4/2013 |

OTHER PUBLICATIONS

International Preliminary Report on Patentability for PCT/JP2015/065273 dated Mar. 21, 2017.

* cited by examiner

BATTERY MODULE

TECHNICAL FIELD

The present invention relates to a battery module.

BACKGROUND ART

In the related art, for example, a battery module formed by arranging a plurality of battery cells such as lithium ion secondary batteries or the like is known. In such a battery module, by enclosing an array body of battery cells by a retaining tool such as a metal plate or the like to be restricted with a constant load, variation in properties such as internal resistance or the like in the battery cells is suppressed. For example, in a battery pack disclosed in Patent Literature 1, a metal band having bent portions at both ends thereof is fixed to an end plate, and a battery block is restricted by the end plate in a stacking direction. In such a battery module, in order to prevent damage to a retaining member due to expansion of the battery cells, an elastic body such as rubber or the like may be interposed between the array body and an end plate of the retaining member.

In addition, a harness used for detection of a voltage or the like of each of the battery cells is assembled to the battery module. For example, in the battery pack disclosed in Patent Literature 2, by holding connectors including voltage detection terminals by a holding member and attaching the holding member to a battery group, the connectors are collectively electrically connected to electrode terminals of the battery cells.

CITATION LIST

Patent Literature

[Patent Literature 1] Japanese Unexamined Patent Publication No. 2013-055069
[Patent Literature 2] Japanese Unexamined Patent Publication No. 2008-243412

SUMMARY OF INVENTION

Technical Problem

In assembling the harnesses to the battery module, complication of interconnections of the harnesses should be avoided. For this reason, base end sides of a plurality of harnesses are bound by a binding member, and are preferably attached to the battery module in this harness bundle state. In addition, when connecting terminals of harness tips are connected to the electrode terminals of the battery cells, lengths of the harnesses that branch off at a tip side of the binding member may differ from each other so that they can be connected correctly.

Meanwhile, a gas may be generated inside a case due to abnormalities such as overcharge or the like, or the battery cells may expand due to aging degradation or the like. When expansion occurs in the battery cells, connecting positions between the electrode terminals of the battery cells and the connecting terminals of the harnesses are assumed to move with respect to a position at which the harness bundle is bound. Here, when lengths of the harnesses branched off at the tip side of the binding member are insufficient, loads are applied to the harnesses, and defects such as disconnection or the like may be caused.

In order to solve these problems, the present invention is directed to provide a battery module capable of suppressing a load applied to a harness even when expansion occurs in a battery cell.

Solution to Problem

In order to solve these problems, a battery module according to an aspect of the present invention includes an array body in which a plurality of battery cells are arranged; a plurality of harnesses extending in an array direction of the battery cells in the array body and having connecting terminals of tips connected to electrode terminals of the predetermined battery cells; and a binding member configured to bind the plurality of harnesses in a harness bundle, wherein the harnesses branched off from the binding member have flexure between a position at which the harnesses are bound by the binding member and connecting positions of the electrode terminals and the connecting terminals.

In the battery module, the harnesses branched off from the binding member have flexure between the position at which the harnesses are bound by the binding member and the connecting positions of the electrode terminals and the connecting terminals. For this reason, even when expansion occurs in the battery cell and the connecting positions of the electrode terminals of the battery cells and the connecting terminals of the harnesses are moved to the position at which the harnesses are bound, insufficiency of the length of the harness branched off at the tip side of the binding member can be prevented. Accordingly, a load is suppressed from being applied to the harness, and occurrence of defects such as disconnection or the like is suppressed.

In addition, the battery module may further include an elastic body disposed at one array end of the battery cells in the array body; and a retaining member configured to restrict the array body in the array direction via the elastic body, wherein the plurality of harnesses may be pulled from the one array end side, at which the elastic body is disposed, toward the array body, and the position at which the harnesses are bound by the binding member may be disposed closer to the elastic body than the connecting position between the electrode terminal and the connecting terminal.

When the elastic body is disposed at the one array end of the battery cells in the array end, the array body expands toward the elastic body in one direction when expansion occurs in the battery cell. For this reason, the connecting positions of the electrode terminals and the connecting terminals in the battery cell are moved in one direction from initial positions toward the elastic body when expansion occurs. Accordingly, by disposing the position at which the harnesses are bound by the binding member closer to the elastic body than the connecting position between the electrode terminal and the connecting terminal, even when the connecting positions of the electrode terminals of the battery cells and the connecting terminals of the harnesses are moved to the position at which the harnesses are bound, insufficiency of the length of the harness branched off at the tip side of binding member can be appropriately prevented.

In addition, the position at which the harnesses are bound by the binding member may be disposed closer to the elastic body than the connecting position between the electrode terminal and the connecting terminal when the battery cells of the connection destinations expand. Accordingly, even when the connecting positions of the electrode terminals of the battery cells and the connecting terminals of the harnesses are moved to the position at which the harnesses are bound, insufficiency of the length of the harness branched off at the tip side of the binding member can be more reliably prevented.

In addition, a flexure amount of the harness branched off from the binding member may be increased when the battery cell to which the corresponding harness is connected is disposed closer to the elastic body. When expansion occurs in the battery cell, a movement amount of the connecting positions of the electrode terminal of the battery cells and the connecting terminals of the harnesses with respect to the position at which the harnesses are bound is increased when the battery cells are disposed closer to the elastic body. Accordingly, because the flexure amount of the harnesses branched off from the binding member is increased when the battery cells to which the harnesses are connected are disposed closer to the elastic body, even when the connecting positions of the electrode terminals of the battery cells and the connecting terminals of the harnesses are moved to the position at which the harnesses are bound, insufficiency of the length of the harness branched off at the tip side of the binding member can be more reliably prevented.

In addition, a mark showing the position at which the harnesses are bound by the binding member may be installed at each of the harnesses. In this case, upon assembly of the harness to the battery module, the position at which the harnesses are bound by the binding member can be easily recognized. Accordingly, a deviation of the binding range with respect to each of the harnesses is suppressed, and the length of the harness branched off at the tip side of the binding member can be more reliably secured.

In addition, the harnesses may be harnesses used to detect a voltage of the battery cell. Disposition of the above-mentioned harnesses is preferable for disposition of the harnesses used to detect a voltage of the battery cell.

Advantageous Effects of Invention

According to the battery module of the present invention, even when expansion occurs in the battery cell, a load applied to the harness can be suppressed.

DESCRIPTION OF EMBODIMENTS

Hereinafter, a preferred embodiment of a battery module according to an aspect of the present invention will be described in detail with reference to the accompanying drawings.

Figure 1:
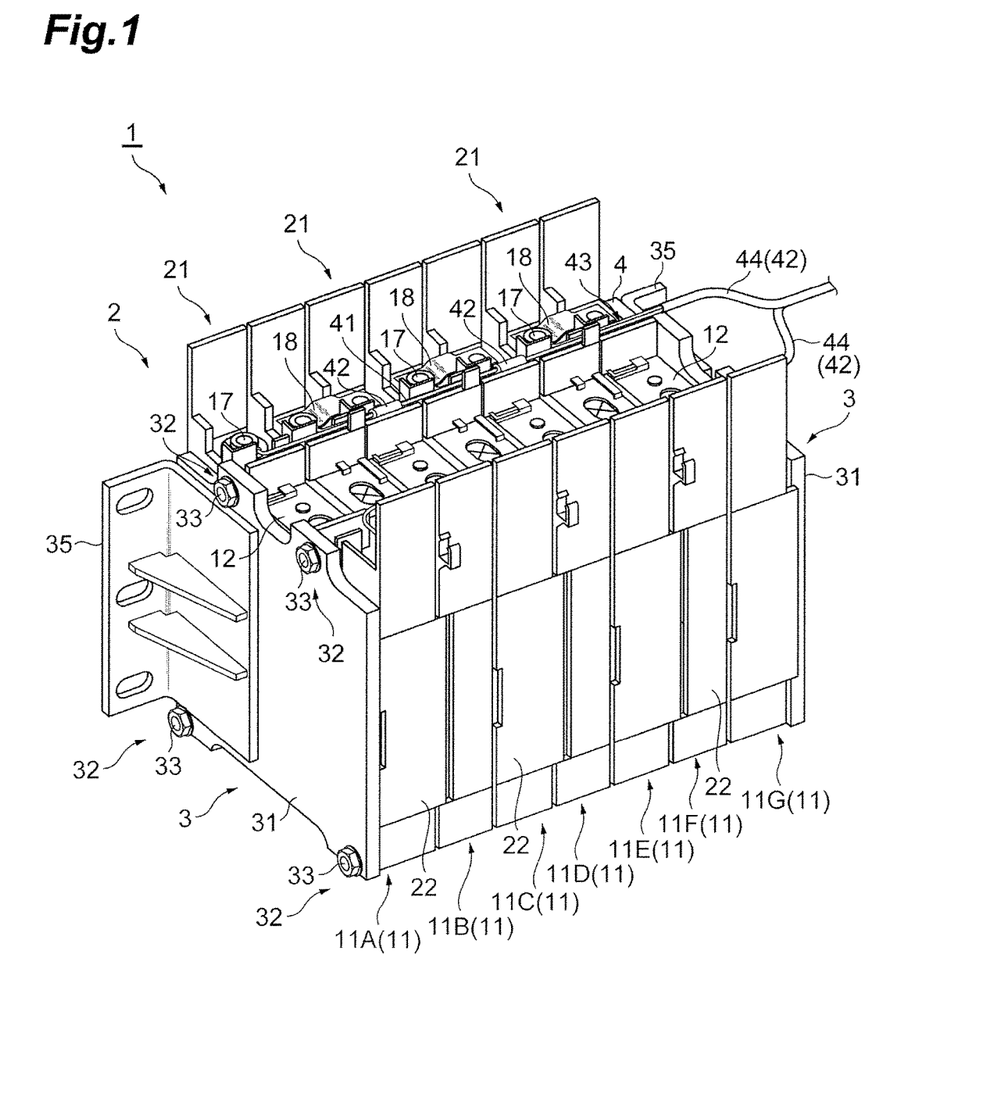
FIG. 1 is a perspective view showing a battery module according to an embodiment of the present invention.
Figure 2:
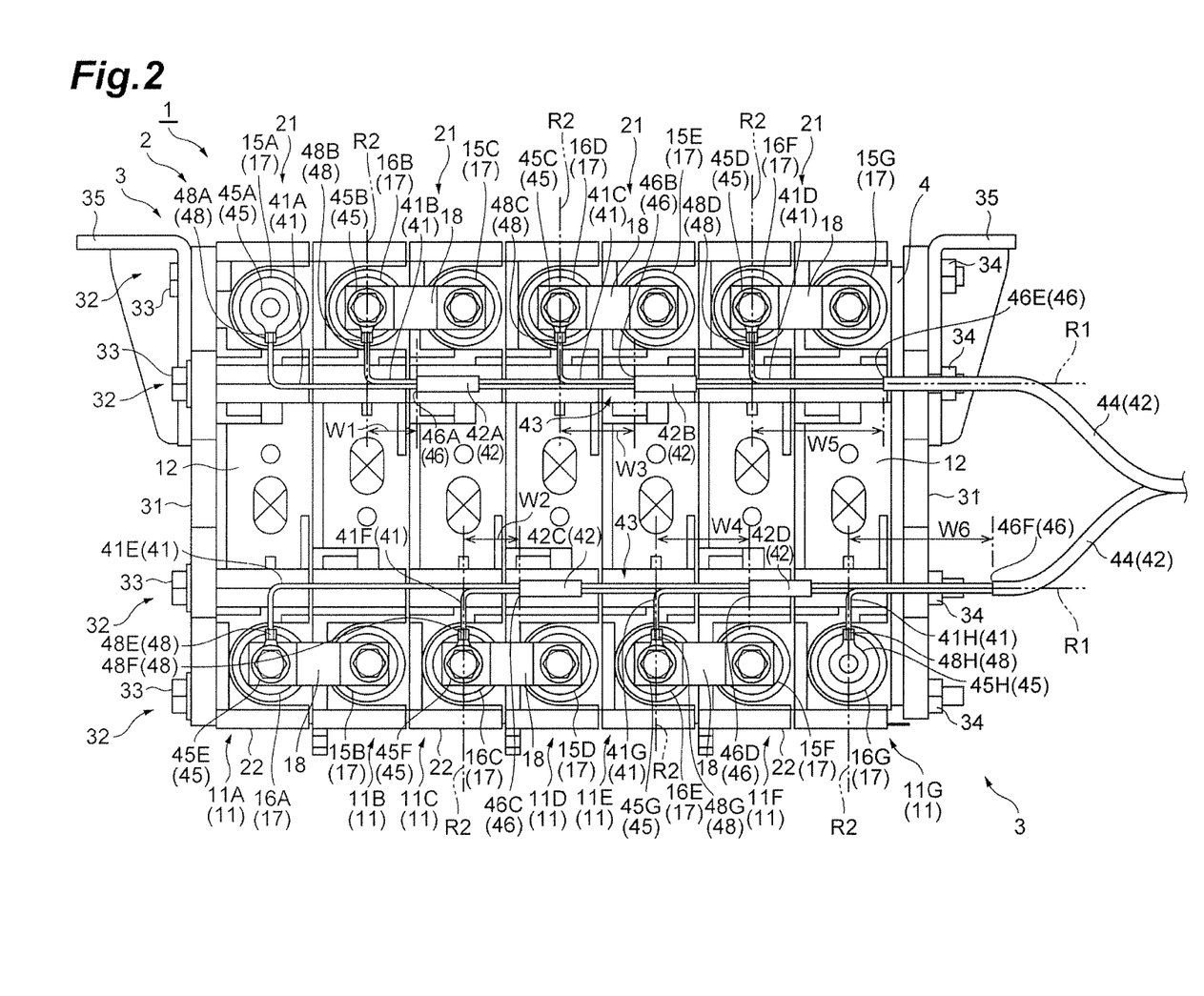
FIG. 2 is a plan view of the battery module shown in FIG. 1.

FIG. 1 is a perspective view showing a battery module according to an embodiment of the present invention. In addition, FIG. 2 is a plan view of the battery module shown in FIG. 1. As shown in FIGS. 1 and 2, a battery module 1 includes an array body 2 in which a plurality of battery cells 11 are arranged, a retaining member 3 configured to add a restriction load to the array body 2 in an array direction of the battery cells 11, and an elastic body 4 interposed between the array body 2 and the retaining member 3.

The array body 2 is constituted of, for example, a plurality of (here, 7) battery cells 11 (11A to 11G toward the elastic body 4). A heat transfer plate (not shown) is interposed between the battery cells 11 and 11. The battery cells 11 constitute a non-aqueous electrolytic solution secondary battery such as a lithium ion secondary battery or the like. The battery cells 11 are formed by accommodating electrode assemblies in hollow cases 12 having, for example, substantially rectangular parallelepiped shapes. Pairs of electrode terminals 17 and 17 are installed apart from each other at top surfaces of the cases 12. As shown in FIG. 2, one of the electrode terminals 17 is a positive electrode terminal 15 connected to a positive electrode of the electrode assembly, and the other terminal of the electrode terminals 17 is a negative electrode terminal 16 connected to a negative electrode of the electrode assembly. The neighboring battery cells 11 and 11 are disposed such that the positive electrode terminal 15 and the negative electrode terminal 16 are adjacent to each other, and the positive electrode terminal 15 and the negative electrode terminal 16 that are adjacent to each other are electrically connected to each other in series by connecting the terminals using a bus bar member 18.

In addition, as shown in FIGS. 1 and 2, battery holders 21 are attached to the battery cells 11. Each of the battery holders 21 has a frame body 22 integrally formed of, for example, a resin. The frame bodies 22 are inserted into the cases 12 along side surfaces except for side surfaces in the array direction of the battery cells 11, among side surfaces of the cases 12 of the battery cells 11.

The retaining member 3 includes, for example, a pair of end plates 31 and fastening members 32 configured to fasten the end plates 31. The end plates 31 are formed of a metal such as iron or the like, and formed in a substantially rectangular plate shape having an area larger than an area when the battery cells 11 are seen from the array direction. The end plates 31 are disposed at both ends in the array direction of the array body 2 and the elastic body 4 in a state in which outer edge portions thereof overhang further outward than outer edge portions of the battery cells 11. Further, brackets 35 are attached to the end plates 31. The battery module 1 is strongly fixed to a wall section of a housing or the like via the brackets 35.

Each of the fastening members 32 is constituted of, for example, a long bolt 33 and a nut 34 threadedly engaged with the bolt (see FIG. 2). For example, the bolts 33 are inserted into the end plates 31 at the outer edge portions of the end plates 31. By threadedly engaging the nuts 34 with both ends of the bolts 33 from the outside of the end plates 31, the battery cells 11, the elastic body 4 and the heat transfer plate are sandwiched and unitized, and a restriction load is applied.

The elastic body 4 is a member used to prevent damage to the restriction part in addition to prevention of damage to the battery cells 11 due to the restriction load, and for example, is formed of a urethane rubber sponge in a rectangular plate shape. The elastic body 4 is disposed at one end in the array direction of the battery cells 11 in the array body 2. For example, ethylene propylene diene rubber (EPDM), chloroprene rubber, silicon rubber, or the like, may be exemplified as a formation material of the elastic body 4. In addition, the elastic body 4 is not limited to rubber but may be a spring member or the like.

In the battery module 1 having the above-mentioned configuration, as shown in FIG. 2, a plurality of harnesses 41 used to detect voltages of the battery cells 11 are assembled. The plurality of harnesses 41 are interconnected in the array direction of the battery cells 11 in a state in which the harnesses are bound by a binding member 42 as the harness bundles 43. In the embodiment, a pair of harness bundles 43 and 43 are pulled from the elastic body 4 side toward the battery cells 11 along an array of the one electrode terminals 17 of the battery cells 11 and an array of the other electrode terminals 17 of the battery cells 11.

Base end sides of the harness bundles 43 and 43 are joined outside the battery module 1 while coated with coating members 44 to be electrically connected to, for example, a voltmeter (not shown) disposed above the battery module 1. The harnesses 41 before the coating member 44 and the binding member 42 are branched off at tip sides of the harness bundles 43 and 43. As shown in FIG. 2, by installing connecting terminals 45 (45A to 45G) at tips of the branched harnesses 41 and the connecting terminals 45 are connected to the electrode terminals 17 of the predetermined battery cells 11, the harnesses 41 are electrically connected to the battery cells 11.

Figure 3:
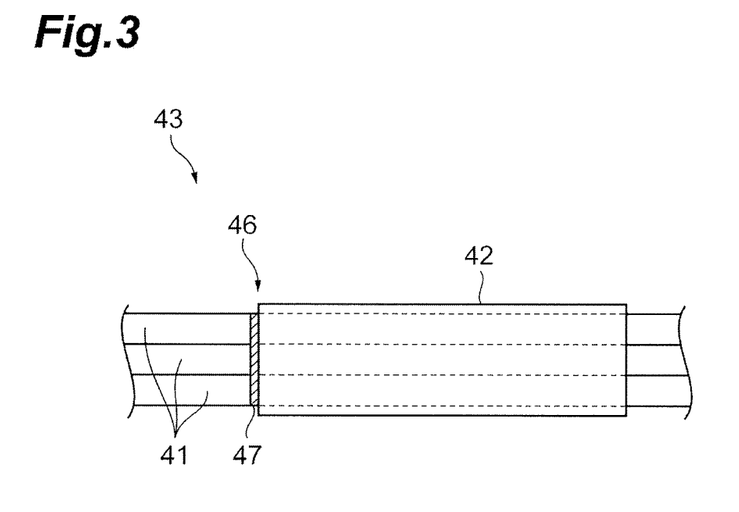
FIG. 3 is a schematic view showing a harness bundle obtained by binding a plurality of harnesses using a binding member.

As shown in FIG. 3, the binding member 42 is constituted by, for example, a resin tape, a resin tube, or the like. A length L of the binding member 42 can be set to an arbitrary length within a range in which disposition of the harnesses 41 branched off from the other binding member 42 is not interfered with. In addition, a mark 47 showing a position 46 at which the harnesses are bound by the binding member 42 (a position of the tip of the binding member 42) is formed at the harnesses 41 bound by the binding member 42. While the mark 47 is not particularly limited, for example, a resin tape or a resin tube may also be used, or paint may also be applied or printed thereon. In addition, a groove, a concave section, or the like may be provided therein.

As shown in FIG. 2, the two binding members 42 are installed at the harnesses 41 of the embodiment at a constant interval from the coating member 44. In addition, the coating member 44 configured to bundle the base end sides of the harness bundles 43 and 43 also has a function as the binding member 42. In the one harness bundle 43, the harness 41A branched off from the binding member 42A of the tip side is connected to the positive electrode terminal 15A of the battery cell 11A, and similarly, the harness 41B branched off from the binding member 42A is connected to the negative electrode terminal 16B of the battery cell 11B. In addition, the harness 41C branched off from the binding member 42B of the base end side is connected to the negative electrode terminal 16D of the battery cell 11D, and the harness 41D branched off from the coating member 44 is connected to the negative electrode terminal 16F of the battery cell 11F.

In addition, in the other harness bundle 43, the harness 41E branched off from the binding member 42C of the tip side is connected to the negative electrode terminal 16A of the battery cell 11A, and similarly, the harness 41F branched off from the binding member 42C is connected to the negative electrode terminal 16C of the battery cell 11C. In addition, the harness 41G branched off from the binding member 42D of the base end side is connected to the negative electrode terminal 16E of the battery cell 11E, and the harness 41G branched off from the coating member 44 is connected to the negative electrode terminal 16G of the battery cell 11G.

Figure 4:
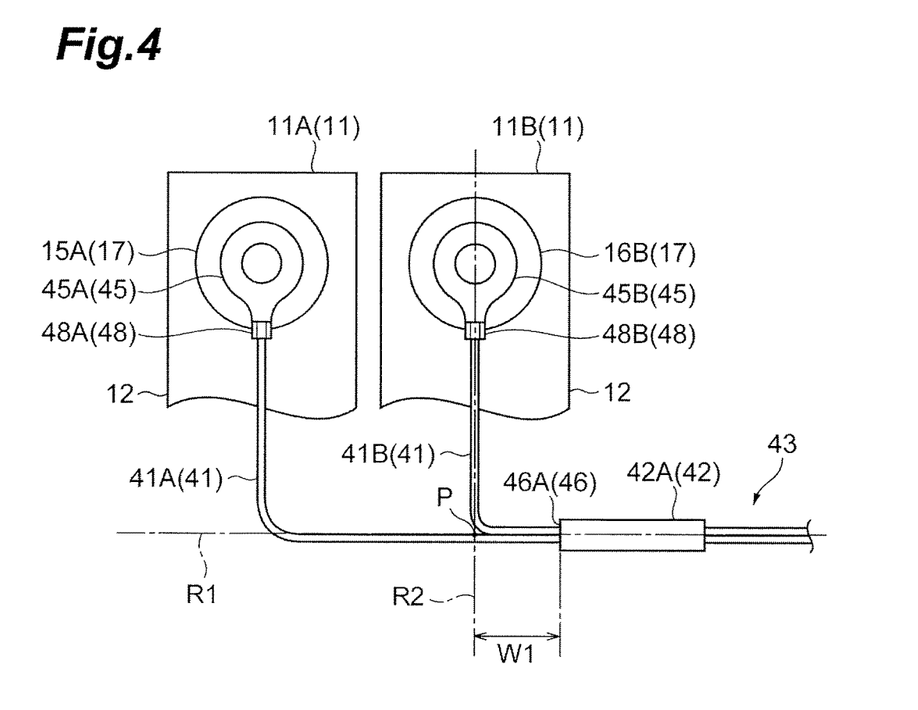
FIG. 4 is a partially enlarged schematic view showing an assembled state of the harnesses branched off from the binding member in the battery module of FIGS. 1 and 2.

Here, in the battery module 1, the harnesses 41 branched off from the binding member 42 have flexure between the position 46 at which the harnesses 41 are bound by the binding member 42 and connecting positions 48 of the electrode terminals 17 and the connecting terminals 45. FIG. 4 is a schematic view showing a state of harnesses branched off from the binding member. In an example of FIG. 4, the harness 41A connected to the positive electrode terminal 15A of the battery cell 11A and the harness 41B connected to the negative electrode terminal 16B of the battery cell 11B are shown.

As shown in FIG. 4, in the battery module 1, the position 46A at which the harnesses 41A and 41B are bound by the binding member 42A is disposed closer to the elastic body 4 than the connecting position 48B between the negative electrode terminal 16B of the battery cell 11B and the connecting terminal 45B of the harness 41B. More specifically, the position 46A at which the harnesses 41A and 41B are bound by the binding member 42A is disposed at the elastic body 4 side at a predetermined interval W1 with respect to an intersection P at which a line segment R1 in an extension direction of the harness bundles 43 and a line segment R2 connecting centers of the electrode terminals 17 and 17 of the battery cells 11 cross. Accordingly, the harness 41B branched off from the binding member 42A has flexure between the position 46A at which the harnesses are bound by the binding member 42A and the connecting position 48B.

While the predetermined interval W1 is appropriately set in accordance with a thickness of the case 12 of the battery cells 11, a kind of the harnesses 41, and so on, it is preferable to consider an expansion amount of the battery cells 11. That is, the position 46A at which the harnesses are bound by the binding member 42A is preferably disposed closer to the elastic body 4 than the connecting position 48B between the negative electrode terminal 16B and the connecting terminal 45B when the nearest battery cell 11B expands (see FIG. 5).

Figure 5:
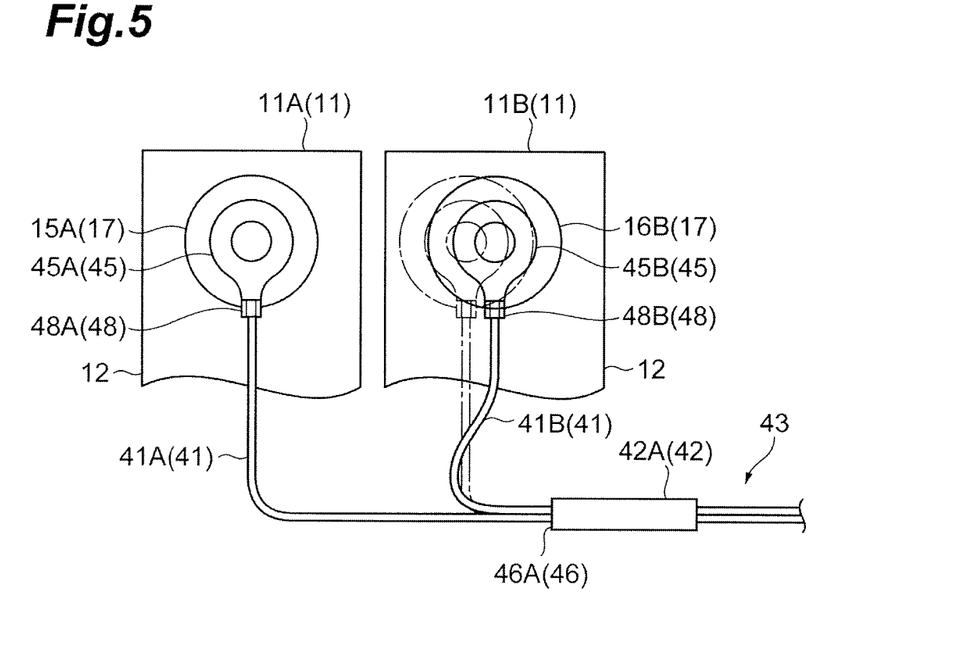
FIG. 5 is an enlarged schematic view of a major part showing a state of the harness upon expansion of the battery cell shown in FIG. 4.

FIG. 5 is a view showing an effect of the harnesses 41A and 41B shown in FIG. 4. In the battery module 1, as described above, the elastic body 4 is disposed at one end (the battery cell 11G side) of the array body 2 in the array direction of the battery cells 11. For this reason, when expansion occurs in the battery cells 11, the array body 2 expands in one direction at the elastic body 4 side in a range in which the elastic body 4 can be compressed. Here, while the connecting position 48A between the positive electrode terminal 15A and the connecting terminal 45A of the battery cell 11A directly restricted by the end plates 31 hardly varies, the connecting position 48B between the negative electrode terminal 16B and the connecting terminal 45B of the battery cell 11B moves from an initial position toward the elastic body 4 as shown in FIG. 5.

With respect to movement of the connecting position 48B, in the battery module 1, the position 46A at which the harnesses 41A and 41B are bound by the binding member 42A is disposed closer to the elastic body 4 than the connecting position 48B between the negative electrode terminal 16B and the connecting terminal 45 when the nearest battery cell 11B expands, and the harness 41B branched off from the binding member 42A has flexure between the position 46A at which the harnesses are bound and the connecting position 48B. Accordingly, even when the connecting position 48B moves from the initial position toward the elastic body 4, insufficiency of the length of the harness 41B branched off from the binding member 42A is prevented, and the flexure of the harness 41B is maintained. By maintaining the flexure of the harness 41B, since an excessive load such as tension or the like can be suppressed from being applied to the harness 41B, occurrence of defects such as disconnection or the like is suppressed.

Figure 6:
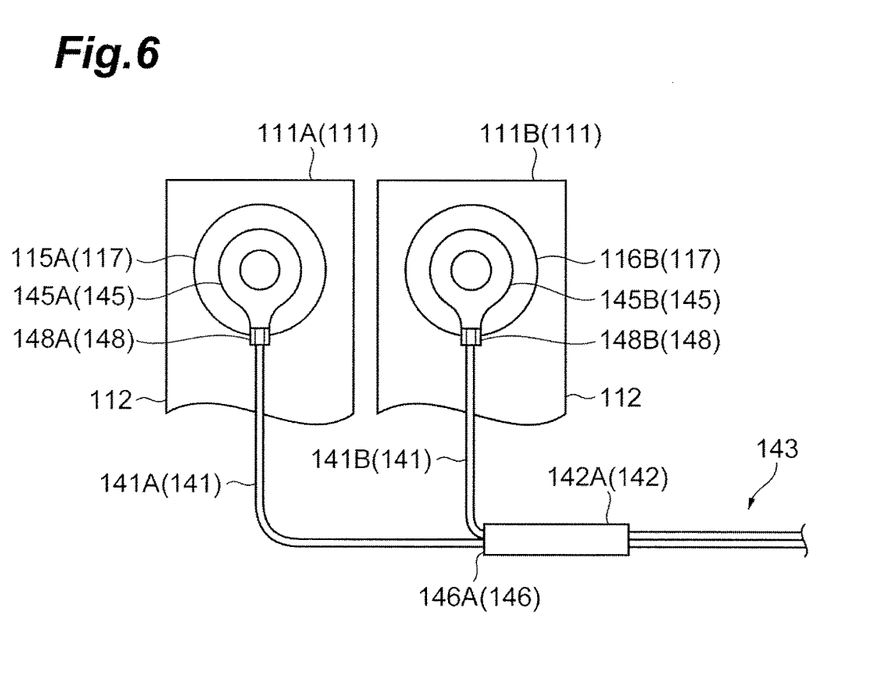
FIG. 6 is a partially enlarged schematic view showing an assembled state of harnesses branched off from a binding member in a battery module according to a comparative example.

FIG. 6 is a partially enlarged schematic view showing an assembled state of harnesses branched off from a binding member in a battery module according to a comparative example. As shown in FIG. 6, in the comparative example, a position 146A at which harnesses 141A and 141B are bound by a binding member 142A and a connecting position 148B of a negative electrode terminal 116B (an electrode terminal 117) of a battery cell 111B and a connecting terminal 145B of the harness 141B are gathered. That is, in the comparative example, the position 146A at which the harnesses 141A and 141B are bound by the binding member 142A substantially coincides with the intersection P at which the line segment R1 in an extension direction of a harness bundle 143 and the line segment R2 connecting a center of the negative electrode terminal 116B of the battery cell 111B and a center of a positive electrode terminal 115B (the electrode terminal 117) intersects. In addition, a length of the harness 141B branched off from the position 146A at which the harnesses are bound substantially coincides with a distance from the position 146A at which the harnesses are bound to the connecting position 148B.

Figure 7:
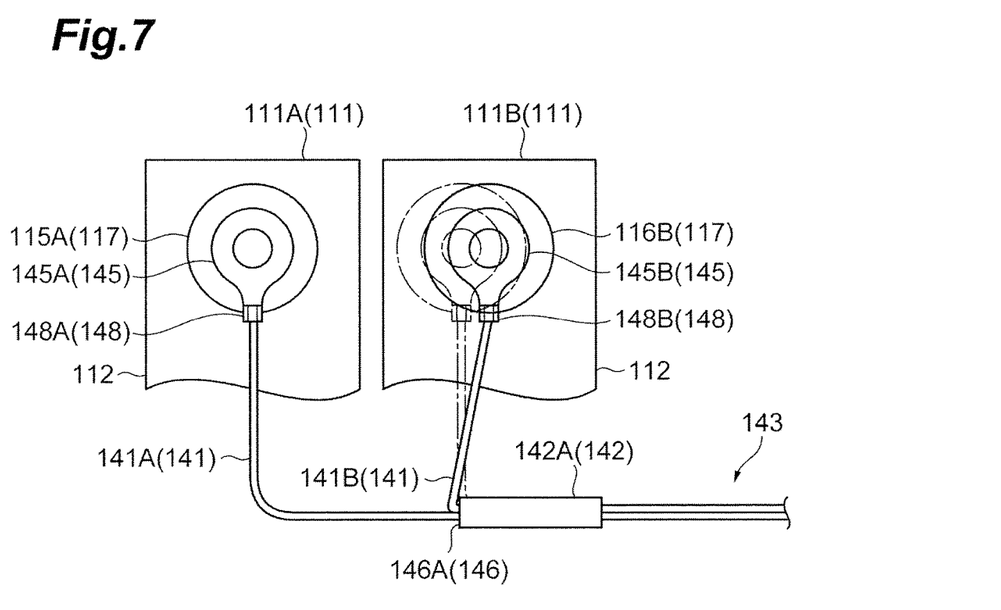
FIG. 7 is a partially enlarged schematic view showing a state of the harnesses upon expansion of battery cells shown in FIG. 6.

In the configuration of the above-mentioned comparative example, the length of the harness 141B is considered to be insufficient with respect to movement of the connecting position 148B when expansion occurs in the battery cells 111. When the length of the harness 141B is insufficient, as shown in FIG. 7, a load due to tension is applied to the harness 141B, and defects such as disconnection or the like may occur in the harness 141B. Accordingly, as shown in FIG. 4, providing the flexure at the harness 141B branched off from the binding member 142A is preferable for suppressing occurrence of defects such as disconnection or the like.

The harnesses 41B, 41C, 41F, 41G and 41G are also the same in that the harnesses 41 branched off from the binding member 42 have flexure. In the battery cells 11C to 11G serving as connection destinations of the harnesses 41, like the battery cell 11B, the connecting positions 48 between the electrode terminals 17 and the connecting terminals 45 move to the initial positions toward the elastic body 4 when the array body 2 expands toward the elastic body 4 in one direction. Accordingly, by providing flexure at the harnesses 41 branched off from the binding member 42, occurrence of defects such as disconnection or the like can be suppressed.

In addition, when expansion occurs in the battery cell 11, a movement amount of the connecting position 48 between the electrode terminal 17 and the connecting terminal 45 toward the position 46 at which the harnesses 41 are bound is increased by adding the expansion amount of each of the battery cells 11 as much as that of the battery cell 11 disposed at the elastic body 4 side. Accordingly, the flexure amount of the harnesses 41 branched off from the binding member 42 is preferably increased when the battery cells 11 to which the harnesses 41 are connected are disposed closer to the elastic body 4. Accordingly, even when the connecting position 48 between the electrode terminal 17 and the connecting terminal 45 moves with respect to the position 46 at which the harnesses are bound due to expansion of the battery cells 11, insufficiency of the lengths of the harnesses 41 branched off from the tip side of the binding member 42 can be more reliably prevented.

In the embodiment, as shown in FIG. 2, in sequence from the battery cell 11A side, when an interval between the position 46C at which the harness 41F is bound by the binding member 42C and the intersection P of the line segment R1 and the line segment R2 is defined as W2, an interval between the position 46B at which the harness 41C is bound by the binding member 42B and the intersection P of the line segment R1 and the line segment R2 is defined as W3, an interval between the position 46D at which the harness 41G is bound by the binding member 42D and the intersection P of the line segment R1 and the line segment R2 is defined as W4, an interval between the position 46E at which the harness 41D is bound by the coating member 44 and the intersection P of the line segment R1 and the line segment R2 is defined as W5, and an interval between the position 46F at which the harness 41G is bound by the coating member 44 and the intersection P of the line segment R1 and the line segment R2 is defined as W6, a relation of W1<W2<W3<W4<W5<W6 is satisfied. Further, in the battery cell 11A, since the connecting position 48A of the positive electrode terminal 15A and the connecting terminal 45A hardly varies, the interval between the position 46 at which the harnesses are bound and the intersection P need not be considered.

In addition, in the battery module 1, the mark 47 showing the position 46 at which the harnesses are bound by the binding member 42 is formed at each of the harnesses 41 (see FIG. 3). With the mark 47, upon assembly of the harness 41 to the battery module 1, the position 46 at which the harnesses 41 are bound by the binding member 42 can be easily recognized. Accordingly, the length of the harnesses 41 branched off from the tip side of the binding member 42 can be more reliably secured while suppressing deviation of a binding range with respect to each of the harnesses 41.

The present invention is not limited to the embodiment. For example, while the harness used to detect the voltage of the battery cell 11 is shown as the harness 41 in the embodiment, a purpose of the harness is not limited thereto. In addition, in the embodiment, because the position 46 at which the harnesses 41 are bound by the binding member 42 deviates from the intersection P of the line segment R1 and the line segment R2 toward the elastic body 4, the flexure is provided at the harnesses 41 branched off from the binding member 42, but means in which the flexure is provided at the harnesses 41 are not limited thereto.

Figure 8:
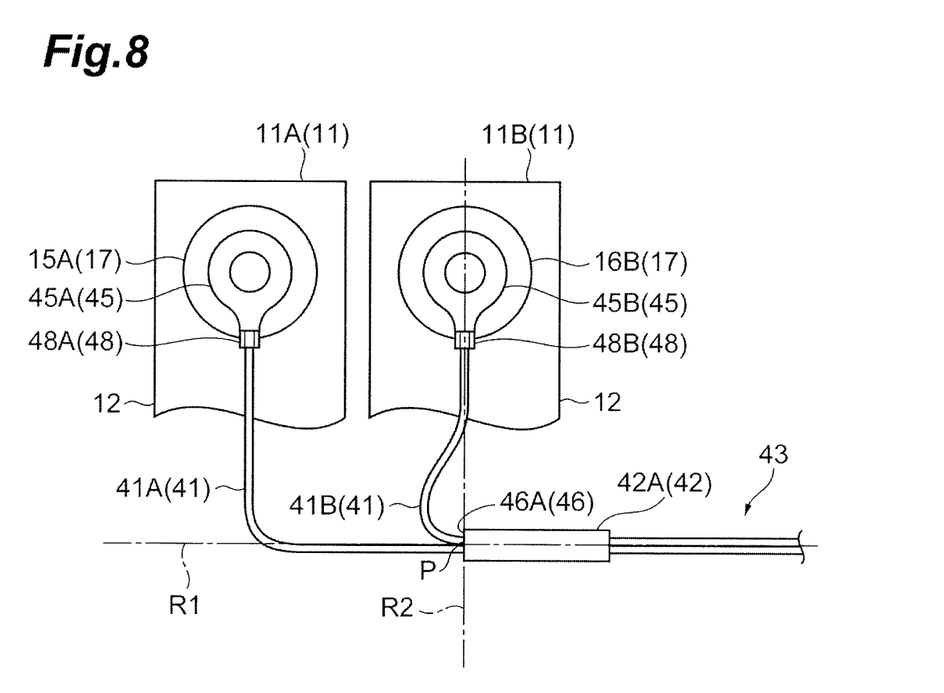
FIG. 8 is a partially enlarged schematic view showing an assembled state of harnesses branched off from a binding member in a battery module according to a variant of the present invention.

For example, as shown in FIG. 8, while the position 46A at which the harnesses 41A and 41B are bound by the binding member 42A substantially coincides with the intersection P of the line segment R1 and the line segment R2, when the length of the harness 41B branched off from the position 46A at which the harnesses are bound is larger than the distance from the position 46A at which the harnesses are bound to the connecting position 48B, the flexure may be provided at the harness 41B. Even in the above-mentioned configuration, insufficiency of the length of the harness 41B branched off from the binding member 42A is prevented, and an excessive load such as tension or the like can be suppressed from being applied to the harness 41B even when the battery cell 11B expands. Accordingly, occurrence of defects such as disconnection or the like is suppressed.

REFERENCE SIGNS LIST

1: Battery module; 2: Array body; 3: Retaining member; 11: Battery cell; 17: Electrode terminal; 41 (41A to 41G): Harness; 42 (42A to 42D): Binding member; 43: Harness bundle; 44: Coating member (binding member); 45 (45A to 45G): Connecting terminal; 46 (46A to 46F): Position at which harnesses are bound; 47: Mark; 48 (48A to 48G): Connecting position.

The invention claimed is:

1. A battery module comprising:
    an array body in which a plurality of battery cells are arranged;
    a plurality of harnesses extending in an array direction of the battery cells in the array body and having connecting terminals of tips connected to electrode terminals of the plurality of battery cells;
    a binding member configured to bind the plurality of harnesses in a harness bundle; and
    an elastic body disposed at one array end of the battery cells in the array body, wherein
    the plurality of harnesses branched off from the binding member have flexure between a position at which the plurality of harnesses are bound by the binding member and connecting positions of the electrode terminals and the connecting terminals,
    the plurality of harnesses are pulled toward the array body from the one array end side at which the elastic body is disposed, and
    the position at which the plurality of harnesses are bound by the binding member is disposed closer to the elastic body than the connecting position of the electrode terminal and the connecting terminal.

2. The battery module according to claim 1, wherein
    the position at which the plurality of harnesses are bound by the binding member is disposed closer to the elastic body than the connecting position between the electrode terminal and the connecting terminal when the battery cells expand.

3. The battery module according to claim 1, wherein
    a flexure amount of a harness branched off from the binding member is increased when the battery cell to which the corresponding harness is connected is disposed closer to the elastic body.

4. The battery module according to claim 1, wherein
    a mark showing the position at which the plurality of harnesses are bound by the binding member is formed at each of the plurality of harnesses.

5. The battery module according to claim 1, wherein
    the plurality of harnesses are harnesses used to detect a voltage of the plurality of battery cells.

6. The battery module according to claim 1, further comprising:
    a retaining member configured to restrict the array body in the array direction via the elastic body.

* * * * *